Patented Apr. 17, 1951

2,549,539

UNITED STATES PATENT OFFICE 2,549,539

STYRENE-DIOLEFIN LOW TEMPERATURE COPOLYMERS AND PREPARATION AND USES THEREOF

William J. Sparks, Westfield, and David W. Young, Roselle, N. J., assignors to Standard Oil Development Company, a corporation of Delaware No Drawing. Application September 14, 1945, Serial No. 616,481

1 Claim. (Cl. 260—84.1)

This invention relates to novel, high molecular weight copolymers and to methods of making and using same. More particularly, it relates to the preparation of unsaturated copolymers of styrene and a polyene.

There have been previous attempts to copolymerize styrene with various diolefins such as butadiene or isoprene, at temperatures below 0° C. with a Friedel-Crafts catalyst, such as aluminum chloride, but the process has heretofore been difficult to control, and the products obtained have only had limited utility.

One object of the present invention is to provide an improved process for effecting the copolymerization of these materials, and another object is to make products having new properties and adapted for use for many different purposes, for which prior art products were not suitable.

Broadly, the present invention comprises copolymerizing styrene with a polyene at temperatures below 0° C., by a dissolved catalyst. A suitable type of catalyst is typified by the one obtained by dissolving aluminum chloride in methyl chloride or ethyl chloride, at or only slightly below the B. Pt. of the solvent, and then cooling the catalyst solution further, if necessary, to reduce it to the desired copolymerization temperature below 0° C.

As Friedel-Crafts catalyst, aluminum chloride and boron fluoride are preferred, although one may also use aluminum bromide, $AlBr_2Cl$, $AlCl_2Br$, $Al_2Br_5Cl$, $TiCl_4$, $TiCl_4$-$AlCl_3$, $TiCl_4$-$AlO(OC_2H_5)$, $AlCl_3$-$Al(OC_2H_5)_3$
$AlCl_3.AlCl_2OH$, $AlCl_3.AlCl_2OH$, $AlBr_3.AlBr_2OH$
$AlBr_2Cl.AlOCl$, $AlBrCl_2.AlOBr$, $TiCl_4.AlCl_2OH$
$TiOCl_2.TiCl_4$, $AlBr_3.Br_2.CS_2$, $AlBr_3.Br_4.CS_2$ $BF_3$-isopropyl alcohol complex, $BF_3$ solution in ethylene, activated $BF_3$ catalyst in ethylene solution, (such as ethyl ether treated $BF_3$) $AlCl_3$-isoprene complex, etc.

Suitable catalyst solvents include the lower alkyl halides such as methyl chloride, ethyl chloride and the like, or a mixture of a lower alkyl halide with a light hydrocarbon such as butane, propane, etc., or other solvents such as carbon disulfide. Dissolved $CO_2$ may also be present in the $CH_3Cl$ catalyst solvent.

In preparing the catalyst solution, if the Friedel-Crafts catalyst used is a solid, it is preferably added to the solvent in finely-divided form in an amount equal to or in excess of the desired concentration, and then filtered, if necessary, to remove undissolved solid catalyst, because it is found that such undissolved solid catalyst is not effective in promoting the desired copolymerization, and generally the solid catalyst particles become coated with polymerization and/or copolymerization products under circumstances making the catalyst totally useless and harmful. It is frequently desirable to make a stronger concentration of catalyst solution than actually desired to be used in the copolymerization, or in other words, it is often desirable to make a concentrated catalyst stock solution, which may then be diluted with further solvent when ready for use in the copolymerization process. If it is desired to use aluminum chloride dissolved in methyl chloride as the catalyst solution, it is preferred to effect the solution at a temperature of about —30° C., using about 0.4 to 0.8% by weight of aluminum chloride. If the aluminum chloride is to be dissolved in ethyl chloride, the preferred solution temperature is about —78° to 0° C., and the preferred concentration is about 0.8 to 5% by weight of aluminum chloride. On the other hand, if a gaseous catalyst such as boron fluoride is used, it may be readily dissolved in the solvent such as methyl chloride or ethyl chloride, by bubbling the gas through the liquid at a temperature of about —100° C. or about —30° C. respectively, with or without the use of super-atmospheric pressure to assist in the solution.

The polyene to be copolymerized with styrene according to this invention, may be selected from a wide variety of dienes, trienes, or higher polyenes, or mixtures thereof. Suitable dienes or diolefins include butadiene, isoprene, piperylene (4-methyl butadiene 1,3, 2,3 dimethyl butadiene 1,3, 1,4 dimethyl butadiene 1,3, heptadiene 2,4, heptadiene 1,3, 2-methyl 3-ethyl butadiene, 2-methyl pentadiene, di-isobutenyl, 2-methyl pentadiene 1,3, 2-methyl 3-butyl butadiene 1,3, 2,3 diethyl butadiene 1,3, etc. Several suitable trienes include myrcene (i. e., 2-methyl 6-methylene octadiene 2,7), and allo-ocimene (2,6 dimethyl octatriene 2,4,6). Mixtures of these various polyenes may be used. Also, although aliphatic polyenes are preferred, some cyclic polyenes may be used, particularly when in admixture with aliphatic polyenes. Such cyclic polyenes include cyclo pentadiene, and cyclo pentadiene dimer, etc.

The copolymerization is preferably carried out in the presence of a solvent or diluent, which if volatile, may also serve as internal refrigerant. Suitable materials include propane, ethane, ethylene, methyl chloride, etc., and carbon dioxide, either liquid or solid, may also be used as refrigerant. Such materials may be used as either internal or external refrigerants, or both, to remove the liberated heat of copolymerization. The amount of such solvent and/or diluent to be used may vary from about 1 to 10, preferably about 2 to 4 volumes per volume of mixed reactants. The type of solvent used depends upon the temperature at which one plans to formulate the polymer. For example styrene is not soluble in propane below $-40°$ C., however it is quite soluble in methyl chloride from $-23°$ C. to $-98°$ C. Therefore if a styrene type copolymer is to be made below $-40°$ C. some alkyl halide must be used in the mixture.

The proportions in which the reactants themselves, namely the styrene and the polyene, should be mixed, may vary over a fairly wide range, depending upon the nature of the particular polyene used, and upon the properties desired in the finished copolymerization product, but normally the mixture of co-reactants per se should contain about 5 to 95% by weight of styrene, and the balance polyene. However, the preferred ratio of styrene is 20 to 75% and the balance polyene.

The preferred procedure for carrying out the copolymerization is to mix the styrene and the polyene, preferably having some diluent or solvent present, cooling the mixture down to the desired operating temperature, either by external or internal refrigeration, and then adding to that reactant solution the desired amount of catalyst solution, which has preferably also been cooled down to the desired copolymerization temperature. The mixture is preferably agitated well during the addition of the catalyst solution. The catalyst solution may either be poured in with stirring, or may be sprayed into the reaction chamber to contact with the surface of the reaction liquid, or may be fed in any other desired manner. Other procedures for carrying out the copolymerization step may be used, such as adding the reactants to the catalyst solution.

The concentration of catalyst used in the copolymerization is preferably adjusted to about 0.2 to 3% by weight of actual Friedel-Crafts catalyst on the basis of the total weight of mixed reactants, i. e. styrene and polyene. This may be readily done by using for instance about 10 to 60% by weight of catalyst solution. It should be understood that the actual amount of catalyst required will depend upon a number of factors including the amount of solvent or diluent condensed with the styrene and polyene, the chemical structure of the polyene, the copolymerization temperature, the desired molecular weight, and yield of copolymer, and also upon the relative effectiveness of the individual Friedel-Crafts catalyst used. For instance, when copolymerizing styrene with butadiene, less aluminum chloride is required than boron fluoride. This same statement may be made for other Friedel-Crafts catalysts. Tests indicate that less aluminum chloride is required than aluminum bromide when styrene is copolymerized with butadiene.

The temperature to be used during the copolymerization may range from slightly below $0°$ C. to as low as $-100°$ C. or $-150°$ C. or lower. A convenient method of controlling the copolymerization temperature is to use as internal refrigerant a substance which vaporizes at the desired copolymerization temperature. For instance, methyl chloride boils at $-23.7°$ C., and therefore, substantially maintains that temperature during copolymerization. Solid carbon dioxide maintains a temperature of about $-73°$ C., while still lower temperature such as $-103°$ C. may be obtained by use of liquid ethylene as external refrigerant.

After the copolymerization has been completed, residual catalyst may be hydrolyzed by adding a lower aliphatic alcohol such as ethyl alcohol, methyl alcohol, or water or caustic soda, or a mixture of any one or more of these or other suitable hydrolyzing agents, which are preferably added while the reaction mixture is still at a low temperature used during the copolymerization. After hydrolysis, the copolymer, preferably still dissolved or solvated in solvent which was present during the copolymerization, is separated from any catalyst sludge and aqueous alcoholic or other hydrolyzing agent present, either by throwing off the latter from the bottom of the reaction vessel, or decanting, centrifuging, or by other suitable separating means. The copolymer, if it has not already precipitated out of the solvent, may then be separated from its solution, by any suitable means such as evaporation of the solvent, or precipitation by a suitable precipitating agent such as acetone, isopropyl alcohol, and methyl alcohol. The copolymer may, if desired, be heated to remove residual traces of solvent, diluent or refrigerant, with or without previous or subsequent washing with water, alcohol, or other suitable liquid.

The resultant copolymer may have a molecular weight ranging from about 2,000 to 30,000 or about 60,000 or more (in the gel type polymer the molecular weight is apparently infinity), preferably about 3,000 to 30,000, and properties will depend on the yield of polymerization, molecular weight and upon the proportions of styrene and polyene used as copolymerization feed. The properties of the copolymer also depend upon the particular type of polyene used. For instance, 2-methyl pentadiene can be copolymerized with styrene at low temperatures to formulate a toluene soluble plastic. The product or copolymer will be soluble, when made at low temperatures ($-103°$ C.) in methyl chloride diluent with

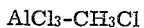

$AlCl_3$-$CH_3Cl$ catalyst, when the yield has been carried through polymerization to 50%, 60%, 80% or even 95% by weight. However, if about 60 to 99% by wt. of butadiene is copolymerized with styrene at $-103°$ C. in methyl chloride diluent by the use of $AlCl_3$-$CH_3Cl$ catalyst, and the yield carried to 60% or 70% by weight, a toluene-insoluble gel type polymer is obtained. In general, however, polymerization tests (carried to good yields) made at $-103°$ C. have indicated that dienes with six or more carbon atoms give soluble type copolymers with styrene, and dienes with less than six carbon atoms give insoluble copolymers with styrene.

These new copolymers may also vary in their degree of unsaturation, depending upon the nature and proportion of polyene used and upon the temperatures of copolymerization, the iodine number generally ranging from about 15 to 300, preferably about 40 to 150. Copolymers, especially those with iodine numbers above about 50, and preferably above 75, are vulcanizable by sulfur or other suitable vulcanizing agents, preferably used in conjunction with a vulcanization accelerator such as mercapto benzothiazole and/or tetramethylthiuram disulfide.

The copolymers of this invention, particularly those with an iodine number of about 100, have the ability to oxidize and harden with age, and therefore, are especially suitable for use in making weather-resistant coating compositions. For such purposes, they are preferably dissolved in a volatile solvent such as a petroleum naphtha or in a paint-type solvent such as turpentine, either alone or together with other paint ingredients such as linseed oil, pigments, resins, dry earth, etc. If desired, the copolymer may be dissolved directly in linseed oil or other suitable fatty oil of the drying, semi-drying, or non-drying type.

These new copolymers may also be used per se for various purposes, depending upon their particular physical and chemical properties. For instance, those which are somewhat flexible and workable may be used in preparing self-supporting film, either by sheeting out through steel rolls, such as the conventional rubber mill, or by sheeting with calender rolls, or by spreading into a layer of desired uniform thickness by a conventional solvent-type spreader when the copolymer is solvent soluble. For sheeting purposes, the copolymer may either be used in a heat softened condition, or plasticized with a suitable, volatile solvent which is later evaporated after a sheet of the desired thickness has been prepared.

These copolymers may also be extruded into various forms such as sheet, tube, rod, or may be moulded into various articles.

These copolymers also are well adapted for use as electrical insulations, either in a vulcanized condition or prepared with a high iodine number, or unvulcanized if they have a relatively low iodine number, e. g., below about 50.

The copolymers of this invention may also be compounded with natural rubber or synthetic rubber of various types, e. g., a butadiene-styrene type, butadiene-acrylonitrile type, isobutylene-isoprene type made at low temperature with low unsaturation, e. g., the one marketed under the name GR–I, and it may also be compounded with various other materials such as paraffin wax, petrolatum, vegetable waxes, asphalt, various resins, e. g., coumarone-indene, styrene-isoprene high temperature resin, polybutadiene resin, dimer acid-ethylene diamine resin, etc., or various plasticizing materials such as heavy mineral oil, etc., or various pigments, fillers, or other powdered solids, e. g., carbon black, clay, zinc stearate, sulfur, as well as anti-oxidants or other stabilizers, e. g., such as the reaction product of paracresol and isobutene.

The objects, advantages, and details of the invention will be better understood from a consideration of the following experimental data:

EXAMPLE 1

2-methyl pentadiene (1,000 g.) was placed in an 8 l. copper reactor. To the solution was then added 2,000 grams of methyl chloride liquid and 300 grams of C. P. liquid styrene. The reactor was then placed in a Dewar flask. Liquid ethylene was then added to the Dewar flask to act as an external refrigerant. When the temperature of the active feed was −101° C., 500 ml. of catalyst solution was added to the surface of the agitated feed at about 150 ml. of catalyst per minute. After the reaction had proceeded for about 8 minutes, 51 ml. of isopropyl alcohol was added to kill the catalyst and stop the reaction. The methyl chloride-copolymer mixture was then removed from the reactor and placed in a Pyrex beaker. After the solvent had evaporated at room temperature the polymer was washed with water and then dried at room temperature. Yield was 92% by weight, copolymer had a softening point of about 50° C., and I. No. of about 120, and contained about 25% combined styrene. The copolymer was a thermoplastic resin. It was placed on a warm rubber mill and sheeted out into a self-supporting film. When first made, the film was very light yellow in color. However, after a period of one year, the film became yellow in color. This change may be due to the effect of light or oxygen on the polymer. The polymer when first made was found to be soluble in linseed oil.

After the film was one year old, it was tested for moisture vapor permeability (M. V. P.) by the A. S. T. M. procedure D697–42T, issued 1942, Method A, Desiccant Method. Results for the film (0.004″ thick) are listed:

| | |
|---|---|
| Intrinsic visc | 0.588 |
| Time of test | 144 |
| Temperature of test °C | 25 |
| Per cent relative humidity | 50 |
| G. H₂O/sq. meter/24 hours | 2.7 |

EXAMPLE 2

The film made in Example 1 was then compounded with 10% by weight of 260,000 molecular weight (Staudinger) polybutene. The resin was very compatible with the high molecular weight polybutene. The hydrocarbon film (copolymer-polybutene) was then tested for M. V. P. by the procedure listed above. Results are given:

| | |
|---|---|
| Time of test hours | 144 |
| Temperature of test °C | 25 |
| Per cent relative humidity | 50 |
| G. H₂O/sq. meter/24 hours | 0.8 |

These data indicated the value of the mixture as a film-forming material. The tensile of the mixture was 1680 lbs. per square inch. A qualitative experiment proved that the resin mixture could be emulsified in water by the use of soaps.

EXAMPLE 3

A 30% styrene-70% 2-methyl pentadiene copolymer was made by the low temperature polymerization of the active olefin feed at −103° C. Three parts of methyl chloride were present per part of active olefin feed. A copper reactor was used and it was cooled externally by the use of liquid ethylene. To this feed (styrene-methyl pentadiene) AlCl₃-methyl chloride catalyst was added. 1500 ml. of catalyst solution was used per liter of active feed. Concentration of catalyst was 0.4 g./100 ml. The time of polymerization was 12 minutes. Reaction was stopped by use of 180 ml. of isopropyl alcohol. The product dried at 100° C.

EXAMPLE 4

The copolymer of 30% styrene-70% 2-methyl pentadiene made in Example 3, was added to G. R. I. made by copolymerizing isobutylene with about 1–3% of isoprene at −103° C. to formulate a mixture that contained 10% by weight of the new type styrene-diene resin. The synthetic rubber mixture was compounded on a laboratory rubber mill with vulcanizing materials as listed below. At the same time G. R. I. was compounded and tested without the "styrene-2-methyl pentadiene" resin.

|  | Stock No. 1 | Stock No. 2 |
|---|---|---|
|  | Pts. | Pts. |
| G. R. I. | 100 |  |
| G. R. I.+10% "30% styrene-70% 2-methyl-pentadiene" resin |  | 100 |
| Zinc Oxide | 5 | 5 |
| Stearic Acid | 3 | 3 |
| Tetramethyl thiuram disulfide | 1 | 1 |
| Mercaptobenzothiazole | 0.5 | 0.5 |
| Easy Processing Channel Black | 50 | 50 |
| Sulfur | 2 | 2 |

The materials (stock No. 1 and No. 2 inclusive) were then placed in a press and heated at 307° F. Inspections on the rubbers will be found in Table I.

*Table I*

| Cure | Stock No. 1 | | | Stock No. 2 | | |
|---|---|---|---|---|---|---|
|  | Tensile | Mod. at 300% | Elong. | Tensile | Mod. at 300% | Elong. |
| 20′ | 2,700 | 375 | 860 | 2,080 | 650 | 730 |
| 40′ | 2,710 | 565 | 720 | 2,000 | 790 | 680 |
| 60′ | 2,740 | 600 | 725 | 2,000 | 770 | 690 |
| 90′ | 2,600 | 750 | 640 |  |  |  |

Results prove the "styrene-2 methylpentadiene" copolymer increases the modulus of the G. R. I. rubber as tested in 20′, 40′, and 60′ cure time.

EXAMPLE 5

1,000 grams of 2-methyl pentadiene were added to 3 l. of methyl chloride. To this mixture was added 1,000 grams of C. P. styrene. The active olefins were held in a large copper reactor. The reactor was cooled to −101° C. by the use of liquid ethylene. The feed was then polymerized by the use of 800 ml. of catalyst solution (the volume of active catalyst used was 0.9 gram $AlCl_3$ in 100 ml. methyl chloride $CH_3Cl$). The catalyst was added at −78° C. to the active feed. The polymer was soluble in the $CH_3Cl$ as the product formed. The "$CH_3Cl$ polymer-catalyst mixture" was then removed from the reactor and placed in a large Pyrex beaker. Water was added to kill the catalyst and also the polymer. After the polymer had been washed in a 50–50 mixture of isopropyl alcohol-water it was dried at room temperature. The polymer, which had a high molecular weight and an iodine number of 130, was soluble in benzene, toluene, and linseed oil. Tests indicated that the copolymer was also soluble in naphthenic base mineral oil with 0 V. I. and 38 S. S. U. viscosity at 210° F. 1% by weight of the polymer increased the V. I. of the oil from 0 to 84. The S. S. U. of the polymer oil blend, at 210° F., was 43. The polymer was not soluble in a paraffinic mineral oil of 43 S. S. U. at 210° F., and 113 V. I.

EXAMPLE 6

The 50% styrene-50% 2-methyl pentadiene copolymer made in Example 5 had a tensile strength of 1700 lbs. per square inch. This copolymer was added to pure gum rubber in equal proportions by weight and mixed on a rubber mill with vulcanizing materials as follows:

|  | Pts. |
|---|---|
| Polymer mix (50/50) | 100 |
| ZnO | 5 |
| Stearic acid | 1 |
| Sulfur | 2.5 |
| Carbon black | 50 |
| Mercaptobenzothiazole | 1.2 |

The compound mixture was then placed in a rubber press and cured by heating for 30, 50 and 70 minutes at 287° F. Results on the cured rubber are shown in Table II.

*Table II*

| Cure Time | Mod. at 300% | Tensile, Lbs./sq. in. | Elong. Break, Per Cent |
|---|---|---|---|
| 30 minutes | 1,575 | 1,970 | 410 |
| 50 minutes | 1,525 | 1,745 | 340 |
| 70 minutes | 1,680 | 1,740 | 340 |

Milling tests proved that the copolymer was compatible with polystyrene, polybutene, dilinoleic acid-ethylene diamine resin, linseed oil, zinc stearate, wax, GR-S, butadiene-acrylonitrile polymer, GR-I styrene-isobutylene-polyolefin polymers and resins, clay, zinc stearate, and other polyolefins.

EXAMPLE 7

A mixture of "90% styrene-10% myrcene" (1,000 grams) was added to 12,000 grams of methyl chloride. To this mixture, having a temperature of about −25° C., was added 1,000 grams of $Al_2Br_5Cl$-butane catalyst. The concentration of the $Al_2Br_5Cl$ in the butane was 2.4 grams per 100 ml. The catalyst was added at about 0° C., the boiling point of the butane solution. As the catalyst was added the active feed became very red. After 120 minutes the polymerization reaction was killed with 45.0 ml. of isopropyl alcohol.

The excess $CH_3Cl$ and alcohol was removed by heat. A hard white copolymer resulted, yield 84%. The polymer, after it was about 3 days old, became slightly yellow in color. Also, the polymer, after it was about 5 days old, became insoluble in toluene. It is believed that the insolubility was due to the absorption of oxygen on the unsaturated part of the copolymer. This oxygen absorption formulated a cross-linked copolymer.

When the hard resin was placed on a hot plate, tests proved it had a sharp melting point at 155° F.

EXAMPLE 8

80 ml. of cp. styrene were added to 400 ml. of liquid methyl chloride, and to this clear solution at −25° C. were added 30 ml. of cc. isoprene. This clear solution was stirred while adding 120 ml. of catalyst solution consisting of 0.9 gram of $AlCl_3$ per 100 ml. of methyl chloride, the temperature of the catalyst solution being about −25° C. The polymerization was very rapid, as the catalyst was added over a period of 5 minutes. The solution and polymer became very red. As the polymer formed, it became insoluble in the methyl chloride; after about 10 minutes, 150 ml. of isopropyl alcohol was added to kill the catalyst. The alcohol also changed the color of the polymer from red to colorless. The product was washed in isopropyl alcohol several times to remove traces of unreacted styrene as well as remove all of the red color. After drying, at a temperature of about 80° C., the polymer was found to be insoluble in hot methyl ethyl ketone. The polymer was also insoluble in toluene. The resin polymer possesses a gel structure, and shows more cross-linking than would be obtained by subjecting the same mixture of styrene and isoprene to polymerization by the emulsion technique at higher temperatures.

This resinous copolymer had a molecular weight of ∞ (infinity) and had a melting point or softening point of about 92°. Chemical analysis showed that it contained 89.3% carbon, 8.87% hydrogen, 0.28% ash, and balance, 1.62% oxygen. This analysis indicates that the copolymer contained about 80% styrene by weight.

EXAMPLE 9

A styrene-methyl pentadiene copolymer containing about 60% combined styrene and having a molecular weight of about 32,000 was made at −103° C. in methyl chloride solvent, using a catalyst comprising a solution of 0.8 gram of $AlCl_3$ per 100 ml. of methyl chloride. This copolymer had a consistency of 30,000 molecular weight polyethylene. The product was soluble in low V. I., that is, 10 to −30, mineral oils.

EXAMPLE 10

The copolymer prepared in Example 9 was modified by mixing 10% and 20% respectively of high molecular weight polyethylene with it, and the resulting products were tested for moisture vapor penetration (M. V. P.) according to the standard A. S. T. M. test D697-42T (part A, 1942). The tests were carried out for 144 hours at 25° C. with 50% relative humidity, using films having a thickness of .004 inch. The copolymer blends containing 10% and 20% respectively of polyethylene showed M. V. P. values of 2.99 and 1.31 grams $H_2O$ per square meter for 24 hours, respectively. This shows that this resinous copolymer is surprising well adapted for the preparation of moisture-resistant films when compounded with substantial amounts of high molecular weight polyethylene.

EXAMPLE 11

A styrene-methyl pentadiene copolymer having about 45% by weight combined styrene and a molecular weight of about 31,000 was made by the same technique as used in Example 9. This copolymer had a heat-softening point of about 60° C.

EXAMPLE 12

20% by weight of polydichlorostyrene was hot mixed with 80% by weight of the styrene-methyl pentadiene copolymer made in Example 11, and the resulting blend was calendered into a thin film having a thickness of about 0.004 inch, which was soft and flexible, slightly stretchable and slightly elastic, with a pale gray, almost colorless nature. This film had a tensile strength of 960 lbs. per square inch when the rate of cool was 20 inches per minute. The water vapor permeability of the film was 1.08 grams $H_2O$ per square meter for 24 hours when tested by the A. S. T. M. method D697-42T (part A, 1942). The blend had a heat-softening point of 79° C., thus showing a considerable increase due to the polydichlorostyrene.

EXAMPLE 13

A mixture of 60% styrene and 40% methyl pentadiene was diluted with 3 volumes of methyl chloride per volume of mixed olefin feed, the mixture cooled to −103° C. and then polymerized by adding 400 ml. of catalyst solution per liter of active olefin feed, the catalyst solution being 0.8 gram $AlCl_3$ dissolved in 100 ml. of methyl chloride. After the polymerization reaction, about 10 minutes, the catalyst was killed with ethyl alcohol, using about 40 ml. per liter of feed. Excess methyl chloride was removed from the polymer by heating, and the polymer was water-washed and then dried on a mill. The dried product was then milled at 100° C. to insure uniformity.

The intrinsic viscosity of the copolymer was found to be 0.84 in toluene solution at 20° C. The tensile strength of the product was found to be 2600 lbs. per square inch. The polymer was soluble in benzene, toluene, and paracymene, but had only low solubility in paraffinic lube oil.

This copolymer was compounded with 100,000 molecular weight polybutenes in equal proportions, and it was found that blends could be calendered sheets, whereas the polybutene alone could not be satisfactorily calendered because it has too much "nerve." This copolymer is also compatible with various synthetic rubber, e. g., GR-I rubber, made by low-temperature copolymerization of isobutylene with about 1% to 3% of isoprene, also with copolymers of styrene and isobutylene containing about 40% to 70% of combined styrene, and with other petroleum products, such as wax, asphalts, etc. The copolymer is also soluble in fatty oil, such as linseed oil, and is useful in making paint, lacquer and varnish compositions. Clay, carbon black, zinc stearate, rubber, resins, etc., may also be added to this copolymer. Oxidation inhibitors may be added to this copolymer if so desired, a suitable sample being the reaction product of paracresol with isobutene in the presence of sulfuric acid at 70° C., this product probably being a 2,6 diparacresol.

EXAMPLE 14

1,000 g. C. P. styrene was added to 4,000 grams of pure methyl chloride. To the styrene-methyl chloride solution, held in a Dewar flask, was added 200 grams of butadiene. When the solution had been cooled to −90° C., by the use of solid powdered dry ice and nitrogen gas, active catalyst solution was added. The $AlCl_3$-methyl chloride catalyst solution (620 g.) was added over a period of 12 minutes onto the surface of the well agitated feed. Concentration of $AlCl_3$ in the methyl chloride was 0.61 g./100 ml. As the catalyst was added the solution became red and the liquid increased in viscosity. Isopropyl alcohol (1,400 ml.) was then added to kill the catalyst and remove all the copolymer from the polymerization feed. The alcohol-washed copolymer was air-dried for 6 hours at room temperature. A colorless resin was obtained. Heat S. P. (ring and ball method) was 114° C.

Milling tests showed that the resin was compatible with polystyrene.

It is not intended that this invention be limited to the specific examples which have been given merely for the sake of illustration, but only by the appended claim in which it is intended to claim all novelty coming within the scope and spirit of the invention.

What is claimed is:

A copolymerization solid product of 20 to 75% styrene and 2-methylpentadiene, as the sole monomers, and which solid product is soluble in volatile aromatic hydrocarbons.

WILLIAM J. SPARKS.
DAVID W. YOUNG.

(References on following page)

REFERENCES CITED

The following references are of record in the file of this patent:

UNITED STATES PATENTS

| Number | Name | Date |
|---|---|---|
| 2,023,495 | Thomas | Dec. 10, 1935 |
| 2,109,772 | Frolich | Mar. 1, 1938 |
| 2,142,980 | Huijser et al. | Jan. 3, 1939 |
| 2,276,893 | Thomas et al. | Mar. 17, 1942 |
| 2,321,440 | Ward | June 8, 1943 |
| 2,336,259 | King et al. | Dec. 7, 1943 |
| 2,387,517 | Kraus | Oct. 23, 1945 |
| 2,400,129 | Nelson et al. | May 14, 1946 |

FOREIGN PATENTS

| Number | Country | Date |
|---|---|---|
| 106,371 | Australia | Jan. 26, 1939 |
| 278,486 | Germany | May 24, 1913 |
| 502,730 | Great Britain | Mar. 20, 1939 |
| 848,411 | France | July 24, 1939 |